United States Patent [19]

Nilsson

[11] 4,091,571
[45] May 30, 1978

[54] CASING FOR THE GRINDING POSITION IN A CENTERLESS GRINDING MACHINE

[75] Inventor: Bengt Nilsson, Lidkoping, Sweden

[73] Assignee: Lidkopings Mekaniska Verkstads AB, Lidkoping, Sweden

[21] Appl. No.: 729,481

[22] Filed: Oct. 4, 1976

[30] Foreign Application Priority Data

Oct. 9, 1975 Sweden .................... 75113027

[51] Int. Cl.² .................... B24B 5/18; B24B 55/04
[52] U.S. Cl. .................... 51/103 TF; 51/272
[58] Field of Search ............ 51/268, 269, 272, 103 R, 51/103 TF

[56] References Cited

U.S. PATENT DOCUMENTS

| 1,689,719 | 10/1928 | Drake | 51/269 X |
|---|---|---|---|
| 1,692,833 | 11/1928 | Heim | 51/103 TF X |
| 2,397,131 | 3/1946 | Decker | 51/103 TF |
| 3,025,644 | 3/1962 | Hogarth | 51/103 TF |
| 3,209,498 | 10/1965 | Dall | 51/103 TF X |

FOREIGN PATENT DOCUMENTS 2,046,637  3/1972  Germany .................... 51/268

*Primary Examiner*—N. P. Godici
*Attorney, Agent, or Firm*—Eugene E. Renz, Jr.

[57] ABSTRACT

A casing for a grinding machine characterized by a pair of hood sections which are actuatable from an open position enabling access to the grinding area and a closed position confining the grinding area in a manner to minimize dispersion of lubricant and coolant liquids and grinding dust to the atmosphere adjacent the grinder.

7 Claims, 5 Drawing Figures

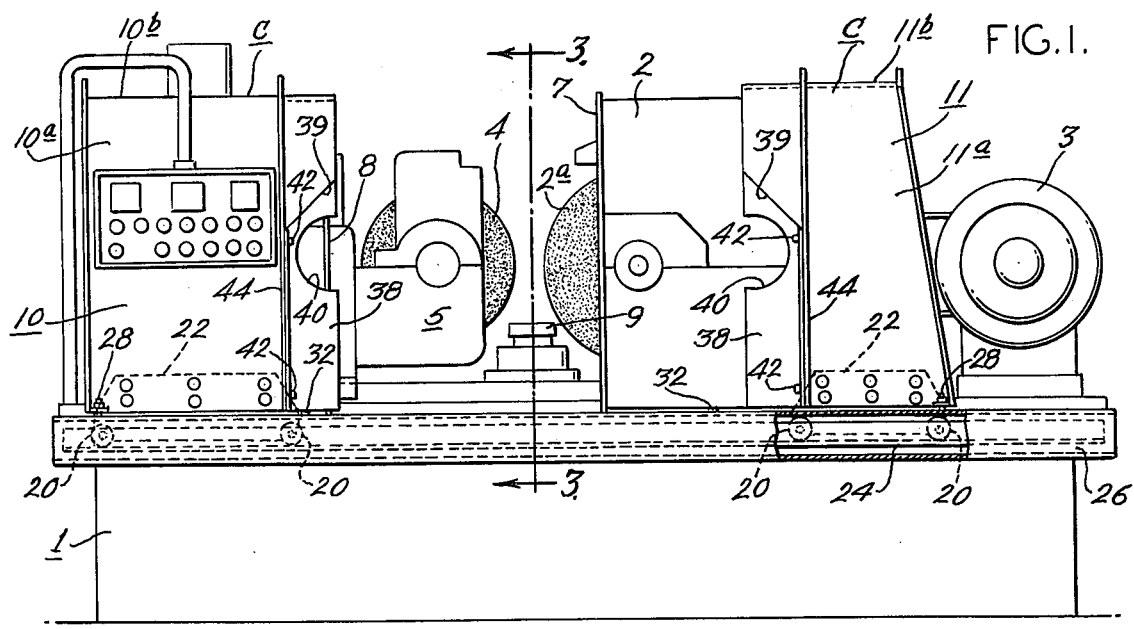
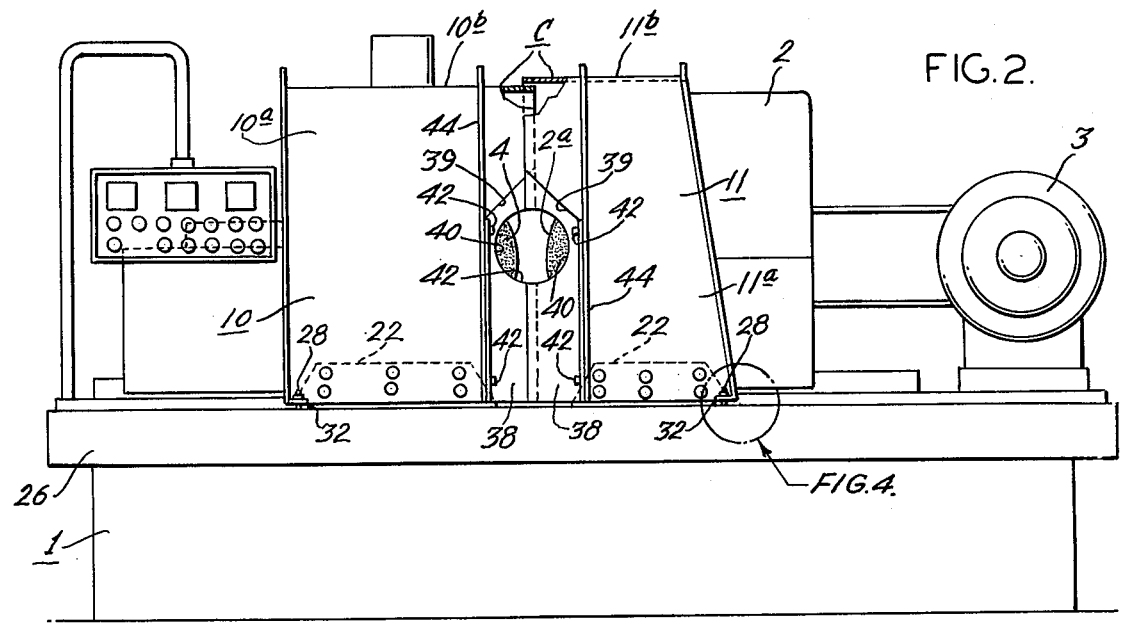
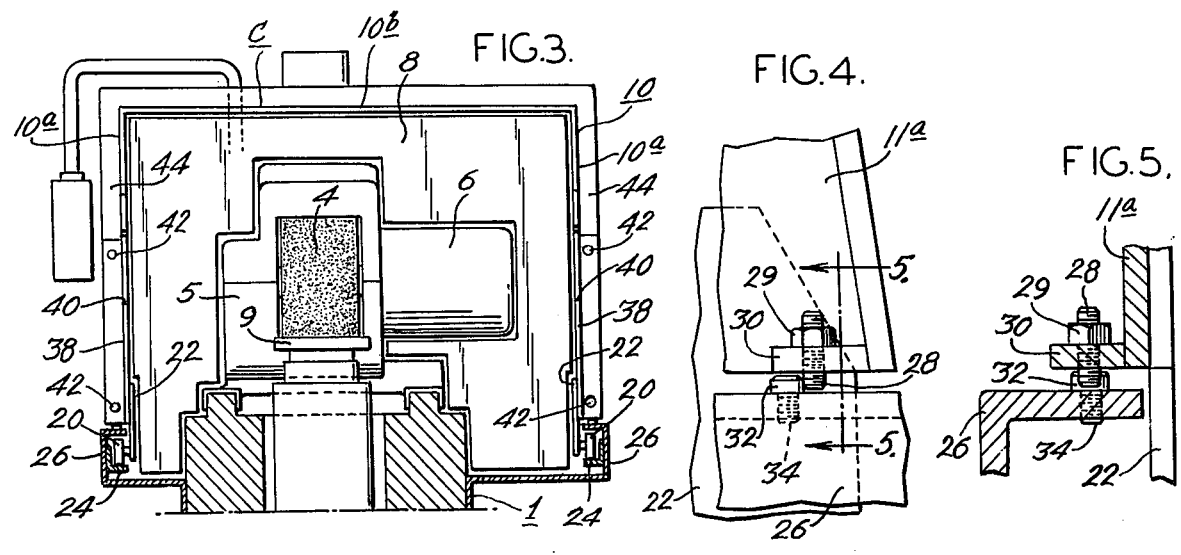

CASING FOR THE GRINDING POSITION IN A CENTERLESS GRINDING MACHINE

BACKGROUND OF THE INVENTION

The present invention relates to a casing for grinding machines and is particularly adapted for centerless grinders.

These centerless grinders generally comprise a rotatable grinding wheel, a feed roller and a support disposed below the axis of the grinding wheel which together define the grinding area of the machine. During a grinding operation, a liquid cooling and lubricating agent is generally fed to the grinding area. Due to the relative high speed of rotation of the grinding wheel, the cooling and lubricating agent, as well as grinding dust, are dispersed outside the grinding area to the environment and generally cause undesirable atmospheric conditions around the grinding machine unless special measures are taken. In some instances, casings and exhaust devices are used to confine the cooling and lubricating agent and grinding dust. Prior devices of this type are comparatively bulky and in some instances hamper the accessibility to the grinding area even when the casing is open. Provision of adequate access to the grinding area has been a particularly difficult problem to solve in centerless grinding machines.

It is therefore an object of the present invention to provide a casing for a grinding machine, particularly a centerless grinder, which is of simple and compact design and which is easily and quickly actuatable from an open position providing good access to the grinding area and a closed position protecting the surrounding environment from the cooling and lubricating agent and grinding dust generated during a grinding operation.

The casing does not obstruct the grinding operation in a closed position permitting all desired adjusting measures without any hindrance. Further, in an open position, the improved casing of the present invention affords good accessibility to all essential parts of the grinder without blocking any essential space around the machine.

BRIEF DESCRIPTION OF THE DRAWING FIGURES

These and other advantages and characteristics of the present invention are hereinafter more fully set forth with reference to the accompanying drawings, wherein:

FIG. 1 is a side elevational view of a centerless grinder with the casing in an open position;

FIG. 2 is a view similar to FIG. 1 showing the casing in a closed position;

FIG. 3 is a transverse sectional view taken on lines 3—3 of FIG. 1;

FIG. 4 is an enlarged fragmentary sectional view of the area encircled in broken lines in FIG. 2 showing the details of the stop mechanism for locating the casing halves in a closed position; and FIG. 5 is an enlarged sectional view taken on lines 5—5 of FIG. 4.

DETAILED DESCRIPTION OF A PREFERRED EMBODIMENT

Referring now to the drawing and particularly to FIG. 1 thereof, the essential components of a centerless grinder are illustrated and comprise a stand or base 1 which supports a suspension 2 for a grinding wheel 2a, which is driven in a conventional manner by a motor 3 connected to the grinding wheel by a standard transmission, such as a belt. A feed roller 4 is mounted on the stand 1 and disposed with its axis parallel to the grinding wheel in a suspension 5, which is tiltable and displaceable in relation to the stand 1 so that the rotational axis of the feed roller 4 is tiltable and laterally displaceable. The output shaft of the motor 6 drives the feed roller 4 through a conventional belt-type transmission.

A transverse wall 7 suitably secured to the suspension 2 is provided adjacent the grinding wheel 2a and as illustrated in FIG. 1, is vertically oriented and generally parallel to the axis of the grinding wheel 2a. The partition wall 7 is provided with a cut-out of a configuration conforming to the peripheral outline of the grinding wheel and is suitably located between the axes of the grinding wheel 2a and the feed roller 4 at a predetermined longitudinal distance from the grinding wheel axis which is preferably less than the radius of the grinding wheel 2a. Another partition wall 8 is provided on the suspension 5 for the feed roller 4 which is also preferably vertically oriented and parallel to the axis of the feed roller 4. This wall 8 and suspension 5 are movable on the stand 1.

A support 9 located on the stand 1 between the grinding wheel 2a and feed roller 4 defines together with the mutually facing parts of the grinding wheel 2a and feed roller 4, the grinding area of the machine.

In order to completely enclose the grinding area during a grinding operation and thereby minimize dispersion of lubricant and coolant liquid and grinding dust, an enclosure or casing assembly C is provided which comprises two movable hood sections 10 and 11, which as illustrated, enclose the partition walls 7 and 8. The hood sections are of generally the same configuration and, as illustrated, are of generally inverted U-shaped cross section. The hood section 10 comprises a pair of upstanding, spaced-apart, parallel sidewalls 10a, 10a, a top wall 10b spanning and connecting the side walls. The hood section 11 likewise comprises parallel sidewalls 11a, 11a and a top wall 11b. This arrangement of the hood sections provides a through opening in the direction of displacement therein, the confinements of which correspond to the outer confinements of the transverse partition walls 7 and 8. The relationship between the wall 8 and hood section 10 is illustrated in FIG. 3. With reference to this view, it can be seen that if the hood 10 is fixed, for example, when the casing is closed, the feed roller in its suspension 5 can be freely displaced within the hood section 10 and also be tilted around a mainly vertical axis. Since the tilting angles are comparatively small, the partition wall 8 will always be closely connected to the hood section 10. Further, it is obvious that the hood section 11 can be displaced over the wall 7 and, since this wall is fixed relative to the stand, a good connection between the wall 7 and the hood section 11 can be easily achieved.

The hood sections 10, 11 are displaceable perpendicularly to the partition walls and, as illustrated, are mounted for movement in a longitudinal direction between an open position (FIG. 1) and a closed position (FIG. 2). The specific mounting arrangement for the hood sections comprises, in the present instance, rollers 20 mounted on brackets 22 secured to the lower terminal edges of the side walls 10a, 11a of the hood sections by screw fasteners. The rollers ride in longitudinal trackways 24 mounted in channel-like enclosed housings 26 on opposite sides of the grinder. This specific mounting arrangement is illustrative and other suitable mounting means for actuating the hood sections may be employed such as a linear bearing arrangement.

In the illustrated embodiment, the hood sections 10,11 are designed to telescope into each other a predetermined distance in the closed position and in order to limit the overlap and determine the closed position of the hood sections, stop means is provided. The stop means comprises, in the present instance, a stud member 28 mounted in a lateral flange 30 projecting from the lower edge of the side wall 10a, 11a of the hood sections, the stud member having a tip portion depending below the flange 30 and aligned to engage the head 32 of a stop screw 34 mounted in the channel member 26. Thus, when the hood sections are moved toward one another to a closed position, the stud 28 engages the head of the stop pin to limit further closing movement of the hood sections and determine the closed position of the casing. The stud member is threaded to permit adjustment of the tip projection and is held in an adjusted position by a lock nut 29.

Another feature of the casing assembly of the present invention is the provision of means permitting the feeding of long work pieces through the grinding area even when the hoods are in a closed position. To this end a cut-out 40, in the present instance of semi-circular form, is provided in the leading edge of the confronting side walls of the hood sections, which when the hood sections are closed, defines a circular bore 42 aligned in a predetermined relation to the grinding area permitting feed of work pieces to the nip of the grinding wheel and feed roller. In order to adapt the size of the bore 42 to work pieces of different sizes, the cut-outs are provided in panel members 38 forming part of the side wall of the hood sections which are detachably secured thereto for ease of interchangeability. To this end, the forward end of the side walls of each of the hood sections is cut back, as at 39, to receive the panel members 38, which are mounted, in the present instance, by screw fasteners 42 to a vertically disposed flange 44 adjacent the open forward end of each of the hood sections. The semi-circular cut-outs 40 of the panels 38 define a circular bore or opening permitting feeding of long work pieces to the nip of the grinding wheel and feed roller on one side of the machine and removal from the other side. These panels are easily interchanged with like panels having either larger cut-outs or cut-outs of a different configuration so that the size of the bore may be adapted to work pieces of different dimensions and thereby provide a more universal casing assembly than would be obtained if only one bore size were used. Further, the flange 44 adjacent to the forward end of the hood sections provides a hand grip for actuating the hood sections between open and closed positions.

Another functional advantage of the present invention is the provision of a cooperating pair of moveable hood sections instead of, for example, only one so that each hood section only has to be displaced a comparatively short distance from between open and closed limit positions. In this manner the machine can be designed in a manner permitting displacement of the hood sections along relatively short portions in relation to the feed roller and grinding wheel. The other parts of the machine can be designed at will which affords a greater design leeway in the grinding machines of this type.

Even though the partition walls 7 and 8 are planar and vertically oriented, which is preferable, it is not absolutely necessary that the hood sections be mounted for displacement perpendicularly to the wall 7 since this partition wall can have an oblique position in relation to the axis of the grinding wheel 2a.

While a preferred embodiment of the present invention has been described in detail, various modifications, alternations and changes may be made without departing from the spirit and scope of the present invention as defined in the appended claims.

I claim:

1. A grinding machine comprising a base, a grinding wheel supported on the base, a feed roller in close proximity to the grinding wheel mounted on a device which is tiltable and displaceable relative to the base for adjustment of the feed roller relative to the grinding wheel, a first wall carried by the grinding wheel support arranged preferably vertically and parallel to the axis of the grinding wheel, said wall being directed along a chord of the grinding wheel and having a cut out exposing a portion of the periphery of said grinding wheel to the grinding area, a second wall mounted on the device supporting the feed roller and preferably disposed vertically and parallel to the axis of the feed roller, said first and second walls longitudinally spaced apart on either side of the grinding area and defining the end closures therefor, a pair of hood members mounted on said base for displacement relative to said walls, one hood member circumscribing said first wall and the other hood member circumscribing said second wall and each hood member having a through opening in the direction of displacement closely conforming to the periphery of the respective walls, said hood members displaceable relative to said walls toward one another to a closed position providing a generally closed chamber around the grinding area and away from one another to an open position to expose the grinding area.

2. A grinding machine as claimed in claim 1 wherein said first and second walls are disposed substantially vertically and are substantially parallel to one another.

3. A casing according to claim 1, characterized by that at least one of the hood sections is provided with an opening to allow passage of a work piece past the grinding area when the casing is closed.

4. A casing according to claim 3, characterized by that the opening is provided in an exchangeable panel forming part of said hood section.

5. A grinding machine as claimed in claim 1 wherein the hood members are of generally inverted U-shaped cross section.

6. A grinding machine as claimed in claim 1 wherein the forward portions of the hood members telescope into each other in the closed position and including stop means for limiting telescoping movement of the hood members thereby determining the closed position thereof.

7. A grinding machine as claimed in claim 6 wherein said stop means comprises longitudinally spaced stop screws in channel members supported on the base defining trackways within which the hood members are moveably mounted by roller supports and stud members carried by each hood section engaging said stop screws in the closed position.

* * * * *